3,388,592
TENSILE TESTING MACHINES
John Harvey Griffiths, Aylesbury, England, assignor to Instron Limited, High Wycombe, England, a British company
Filed Dec. 7, 1965, Ser. No. 512,047
Claims priority, application Great Britain, Dec. 23, 1964, 52,356/64
6 Claims. (Cl. 73—103)

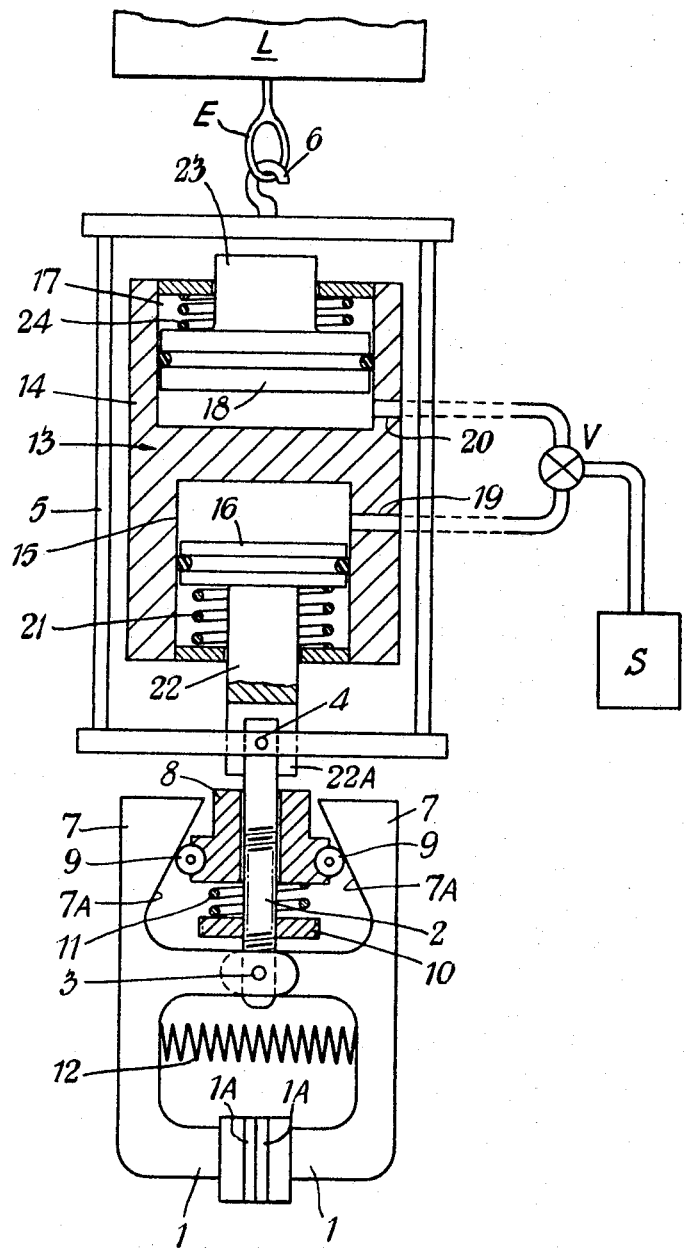

ABSTRACT OF THE DISCLOSURE

For use with a tensile testing machine, apparatus comprising jaws for gripping a test specimen, a carrier supporting the jaws for transmitting load on the specimen to load-measuring equipment, urging means urging the jaws to their closed position, and a controlling mechanism for rendering the carrier ineffective to apply load to the load-measuring equipment and for overcoming the effect of the urging means.

---

This invention relates to tensile testing machines.

According to the present invention there is provided, for a tensile testing machine having load measuring equipment for producing a signal in accordance with the load on a specimen being tested, the combination comprising jaws for gripping an end of a test specimen, a carrier for the jaws, the carrier being adapted for applying a load imposed on the specimen gripped by the jaws to the load measuring equipment, means acting on the jaws and urging them to their closed position, and jaw controlling mechanism for support by a fixed part of the machine, the jaw controlling mechanism being adapted and arranged both for rendering the carrier ineffective to apply load to the load measuring equipment and for releasable engagement with the urging means to overcome the effect of same thereby to open the jaws.

For a better understanding of the invention and to show how the same may be carried into effect reference will now be made, by way of example, to the accompanying drawing, in which:

FIGURE 1 is a diagrammatic sectional elevation of mechanism for operating a pair of jaws of a tensile testing machine.

The tensile testing machine (not shown) has an upper pair of jaws for gripping the upper end of a test specimen such as fine fibres or other like materials, and a lower pair of jaws for gripping the lower end of the specimen. The upper jaws are suspended from a fixed head of the machine and the lower jaws are mounted on a cross-head arranged to be driven downwardly by a screw drive towards a base. The upper jaws are arranged to apply the load imposed on the specimen, as a result of downward driving of the crosshead, to a load capsule on the head and which produces a signal in accordance with the load on the specimen.

FIGURE 1 shows the mechanism which operates the upper jaws 1 and which connects them to the load capsule L. The jaws 1 have specimen gripping faces 1A and are pivotally connected to each other and to the lower end of a vertical rod 2 by means of a horizontally disposed pin 3. The upper end of the rod is pivotally secured by a horizontal pin 4 to the bottom of a stirrup 5 the top of which carries a hook 6 for attachment to an eye E of said load capsule. The jaws 1 are provided with upwardly extending arms 7 the facing surfaces 7A of which diverge downwardly. A plunger 8 mounted on the rod 2 for vertical movement with respect thereto carries rollers 9 which cooperate with the surfaces 7A. The rod 2 is screwthreaded and carries a knurled nut 10. The lower end of a spring 11 bears on the nut 10 and the upper end of this spring urges the plunger 8 upwardly. A light spring 12 maintains the surfaces 7A against the rollers 9.

A piston and cylinder assembly 13 has the cylinder block 14 thereof rigidly secured to said fixed head of the tensile testing machine. The block 14 has therein a lower cylinder 15 containing a piston 16 and an upper cylinder 17 containing a piston 18. The axes of the cylinders are vertical. The upper part of the cylinder 15 communicates via a port 19 and a control valve (diagrammatically indicated at V) with a source of compressed air (diagrammatically indicated at S). The lower part of the cylinder 17 communicates via a port 20 and said control valve with said source of compressed air. A spring 21 is provided in the lower part of the cylinder 15 for urging the piston 16 upwardly. A piston rod 22 extends downwardly from the piston 16 and is bifurcated at its lower end, the legs 22A of the bifurcated part passing on opposite sides of the rod 2 and the bottom part of the stirrup 5. Only one of the legs 22A can be seen in the drawing. A piston rod 23 extends upwardly from the piston 18. A spring 24 is provided in the upper part of the cylinder 17 for urging the piston 18 downwardly.

It will be noted that the piston 18 is of larger surface area than the piston 16 so that when the pressures in the cylinders are the same the force exerted by the piston 18 is greater than that exerted by the piston 16.

The mechanism described above operates as follows. Initially the control valve V connects both the ports 19 and 20 to the source of compressed air. The piston 18 is displaced by the compressed air upwardly against the spring 24 and the rod 23 encounters the stirrup 5 to lift the hook 6 so that no load is applied to the eye of the load capsule. The piston 16 is forced downwardly by the compressed air against the action of the spring 21 and the lower ends of the legs 22A of the rod 22 encounter the top of the plunger 8 pressing this downwardly against the action of the spring 11. Thus the faces 1A swing apart, the light spring 12 keeping the surfaces 7A in contact with the downwardly moving rollers 9. The upper end of the test specimen is then placed between the faces 1A and the control valve is then operated to exhaust the port 19 to atmosphere. The spring 21 displaces the piston 16 upwardly, the plunger 8 moves upwardly under the influences of the spring 11 and the rollers 9 cause the jaws to swing about the pin 3 so that the faces 1A grip the upper end of the specimen. The control valve is then operated to open the port 20 to atmosphere whereupon the spring 24 pushes the piston 18 downwardly so that the stirrup 5 and the parts carried thereby also move downwardly until the hook becomes suspended again from the eye of the load capsule. At the end of the tensile test the jaws 1 will be gripping the upper end of the remains of the test specimen. The port 20 is connected by the control valve to the source of compressed air so that the stirrup 5 and the parts carried thereby are lifted and stop applying any load or force to the capsule. The control valve is then again operated to place the port 19 in communication with the source of compressed air so that the jaws 1 open and release the upper end of the remains of the specimen.

It will be understood that the pressure with which the faces 1A grip the specimen can be adjusted by turning the knurled nut 10 about the rod 2.

Said control valve can be manually operated or arranged for automatic operation by the provision of appropriate electrical control apparatus.

The mechanism of FIGURE 1 thus helps to avoid the possibility that a damagingly high load or force might accidentally be applied, when fixing a fine thread specimen between the upper jaws for testing, to a delicate load capsule.

What is claimed is:
1. For a tensile testing machine, a combination comprising:
   (a) jaws for gripping an end of a test specimen;
   (b) a carrier supporting the jaws and adapted for attachment to load-measuring equipment supported on the machine for transmitting a test load on the specimen gripped by the jaws to the load-measuring equipment;
   (c) urging means acting on the jaws and urging them to their closed position; and
   (d) a controlling mechanism adapted for support by a fixed part of the machine and including means engageable with the carrier for rendering said carrier ineffective to apply any force to the load-measuring equipment and means engageable with said urging means to overcome the effect thereof and thereby to open the jaws.

2. A combination according to claim 1 wherein said urging means includes a displaceable element for being displaced to permit said jaws to open, said means engageable with said carrier includes a first output member for lifting said carrier and said jaws supported thereby, and said means engageable with said urging means includes a second output member for encountering said displaceable element and displacing it downwardly to open said jaws.

3. A combination according to claim 2, wherein said controlling mechanism comprises a piston cylinder assembly having:
   (i) a first cylinder,
   (ii) a second cylinder separate from the first cylinder,
   (iii) a first piston contained in said first cylinder and arranged for operating said first output member, and
   (iv) a second piston contained in said second cylinder and arranged to operate said second output member;
the combination further comprising a valve device connected to the cylinders for separately controlling admission and exhaust of pressure fluid to and from said cylinders to operate said pistons.

4. A combination according to claim 2, wherein said controlling mechanism comprises a piston cylinder assembly having:
   (i) a first cylinder,
   (ii) a second cylinder separate from the first cylinder,
   (iii) a first piston contained in said first cylinder and arranged for operating said first output member, and
   (iv) a second piston contained in said second cylinder and arranged to operate said second output member;
the combination further comprising a source of pressure fluid for operating said piston cylinder assembly, and a valve device connected for separately controlling admission and exhaust of said pressure fluid to and from said cylinders.

5. A combination according to claim 3, wherein said carrier is in the form of a stirrup having a lower part supporting said jaws and having an upper part for being suspended from said load-measuring equipment, and wherein said piston cylinder assembly is arranged within said stirrup.

6. A combination according to claim 1 further comprising adjustment means for controlling the action of said urging means on said jaws.

References Cited
UNITED STATES PATENTS

| | | | |
|---|---|---|---|
| 2,850,926 | 9/1958 | Jobe | 269—34 |
| 3,204,451 | 9/1965 | Cavanaugh et al. | 73—103 |
| 3,232,100 | 2/1966 | Lindsey | 73—93 |

RICHARD C. QUEISSER, *Primary Examiner.*

JAMES H. WILLIAMSON, *Assistant Examiner.*